United States Patent [19]
Omi

[11] Patent Number: 5,240,357
[45] Date of Patent: Aug. 31, 1993

[54] ANNULAR HOLE CUTTER

[75] Inventor: Shohei Omi, Anjo, Japan

[73] Assignee: Omi Kogyo Co., Ltd., Aichi, Japan

[21] Appl. No.: 821,402

[22] Filed: Jan. 14, 1992

[30] Foreign Application Priority Data

Aug. 7, 1991 [JP] Japan .................. 3-198093

[51] Int. Cl.⁵ ............................................. B23B 51/04
[52] U.S. Cl. .................... 408/204; 408/206; 408/703
[58] Field of Search ................ 408/204, 206, 207, 703

[56] References Cited

U.S. PATENT DOCUMENTS

| 4,573,838 | 3/1986 | Omi et al. | |
|---|---|---|---|
| 4,586,857 | 5/1986 | Ohmi | |
| 4,632,610 | 12/1986 | Hougen | |
| 4,758,120 | 7/1988 | Bijl | 408/204 |
| 4,813,819 | 3/1989 | Hougen | |
| 4,952,102 | 8/1990 | Hougen | |

FOREIGN PATENT DOCUMENTS

| 57-177620 | 11/1982 | Japan . | |
|---|---|---|---|
| 57-197411 | 12/1982 | Japan . | |
| 64213 | 4/1984 | Japan | 408/204 |
| 59-93209 | 5/1984 | Japan . | |
| 60-131105 | 7/1985 | Japan . | |
| 3-5923 | 1/1991 | Japan . | |
| 2232619 | 12/1990 | United Kingdom | 408/204 |

Primary Examiner—Daniel W. Howell
Attorney, Agent, or Firm—Limbach & Limbach

[57] ABSTRACT

An improved annular hole cutter is disclosed that has a plurality of alternately arranged first and second cutting teeth positioned at substantially equally spaced intervals about the distal end of the cutter body. All of the cutting teeth having angled bottom faces that are tapered at the same angle towards a radially inner side of the bottom faces. The first cutting teeth each have a substantially straight leading edge that includes an active cutting surface and an inactive surface. The second cutting teeth each have circumferentially stepped inner and outer cutting edges. The relative axial heights of the cutting teeth are adjusted so that the active cutting surfaces of the first cutting teeth are formed at the same axial height as their radially corresponding cutting edges of the second cutting teeth. At the same time, the inactive surface of the first cutting teeth are formed at a different axial height than their radially corresponding cutting edges of the second cutting teeth. This cutter arrangement produces both thin and thick chips that do not excessively entangle to improve cutting efficiency.

8 Claims, 12 Drawing Sheets

ANNULAR HOLE CUTTER

This application claims the priority of Japanese patent application No. 3-198093 filed on Aug. 7, 1991, which is incorporated herein by reference.

BACKGROUND OF THE INVENTION

1. Field of the Invention

The present invention relates to an annular hole cutters. More particularly, it relates to an annular hole cutter having alternating cutting teeth with different geometries.

2. Description of the Related Art

When annular hole cutters of this type are used, it is necessary to smoothly eject chips produced during cutting from the hole being drilled to reduce resistance to the cutting force. This requirement significantly affects the cutting performance of the annular cutter.

Many attempts have been made to improve the cutting performance. The annular hole cutter disclosed in Japanese Unexamined Utility Model Publication No. 57-177620 has a plurality of cutting teeth with sequential teeth having several different geometries. More specifically, as shown in FIGS. 23-26, the disclosed cutter includes four different types of cutting teeth. Some of the teeth, that is teeth 101 and 102, have pointed tips such that they have ridgeline style leading and lower edges. On the other hand, the leading edges of cutting teeth 103 and 104 include a flat or linear portion.

Another known annular hole cutter is disclosed in Japanese Unexamined Utility Model Publication No. 57-197411 and is shown in FIGS. 27 to 29. This cutter also uses ridgeline cutting teeth 105 and 106 together with linear edge cutting teeth 107 as shown in FIGS. 27 to 29. The combined use of different edge cutting teeth will produce chips of different shapes and sizes, so that the chips can be cut into pieces and be ejected smoothly.

In the annular cutters disclosed in both publications, however, the ridgeline cutting teeth and flat edge cutting teeth differ very much in angles and shapes of their bottom faces. This makes the production of these cutters and regrinding of the edges of the teeth troublesome. More specifically, in both producing cutters and regrinding the cutting edges after use, the bottom faces of the cutting teeth have to be ground. If the angles and shapes of the bottom faces vary from tooth to tooth, continuous grinding of the bottom faces is very difficult. A dresser is used for grinding these bottom faces in this case. With the bottom faces having the same angle, the angle of the dresser need not be altered and the dresser can continuously grind those faces.

As shown in FIG. 30, a ridgeline cutting tooth 34 whose cutting edge 31 has a crest 30 close to the center of the cutting edge 31 does not cut into a work piece 22 very well when a hole is to be drilled. In this case, chips are to be ejected in directions perpendicular to the cutting edge 31 as indicated by arrows in FIG. 30. If the cutting edge 31 takes a ridgeline shape, chips cut from opposite sides of the crest 30 will hit against each other above the cutting edge 31. Thus, they are not easily ejected from the hole. Consequently, the cutting edge 31 does not smoothly cut into the work piece 22. In some cases the cutting edge 31 may not properly cut in, so that the annular cutter binds on the work piece 22. This phenomenon is called "walking" in the related industry.

Other annular cutters as disclosed in Japanese Unexamined Patent Publication No. 59-93209, and U.S. Pat. Nos. 4,573,838, 4,586,857, 4,632,610, 4,813,819 and 4,952,102 have been proposed since the disclosure of the above-described types of cutters. Of these, the annular cutter disclosed in Japanese Unexamined Patent Publication No. 59-93209 is shown in FIGS. 31 and 32. Those proposed annular cutters basically use inner cutting teeth 37 each having a relief surface 38 and an outer cutting edge 39 separated inside and outside. With this structure, the annular cutters cut out narrow chips in such a way that the chips will not continuously follow one after another widthwise, thus ensuring smooth ejection of the chips. However, at least half of the teeth in these annular cutters have ridgeline relief surfaces.

It is noted, that the annular cutter disclosed in U.S. Pat. No. 4,952,102 has cutting teeth whose outer walls are slightly thinned. Therefor the crest of such cutting edges are shifted away from the center of the cutting edge. Regardless, the use of ridgeline cutting teeth will cause problems in that work efficiency is lowered when producing annular cutters and regrinding the cutting edges. Further, the cutting action of the teeth cutting into a work piece is poor at the beginning of the drilling.

Further, U.S. Pat. No. 4,952,102 indicates that even with the use of ridgeline cutting teeth, chips are ejected continuously in the widthwise direction. However, no consideration has been taken to form thick and very rigid chips. The annular cutter therefore provides relatively thin and soft chips. Additionally, if chips are cut into pieces to become narrower, the chips become easily entangled with one another due to their softness. Therefore, the chips will be entangled before being discharged from a drilled groove, which again, prevents smooth cutting.

SUMMARY OF THE INVENTION

It is therefore an object of the present invention to provide an improved annular hole cutter which has good chip discharge characteristics and is relatively easy to fabricate and regrind. This object can be accomplished by taking the difference in hardness of chips and in their ejecting speeds into consideration.

To achieve the foregoing and other objects and in accordance with the purpose of the present invention, an improved annular hole cutter is provided. The annular cutter includes a generally cylindrical body having a plurality of alternately arranged first and second cutting teeth positioned at spaced intervals about the distal end of the body. All of the cutting teeth having a front side and a tapered bottom face. Each tapered bottom face having an inner edge near the rotational axis and an outer edge remote from the rotational axis. Each tapered bottom face being arranged so that the inner edge is axially closer to the shank than the outer edge The first cutting teeth each have a leading edge that includes an active cutting surface and an inactive surface. The second cutting teeth each have a stepped leading edge which effectively forms circumferentially stepped inner and outer cutting edges. The relative axial heights of the first and second cutting teeth are adjusted so that the active cutting surfaces of the first cutting teeth are formed at the same axial height as their radially corresponding cutting edges of the second cutting teeth. At the same time, the inactive surface of the first cutting teeth are formed at a different axial height than their radially corresponding cutting edges of the second cutting teeth.

BRIEF DESCRIPTION OF THE DRAWINGS

The invention, together with the objects and advantages thereof, may be best understood by reference to the following description of the presently preferred embodiments together with the accompanying drawings in which.

DETAILED DESCRIPTION OF THE PREFERRED EMBODIMENTS

Figure 1:
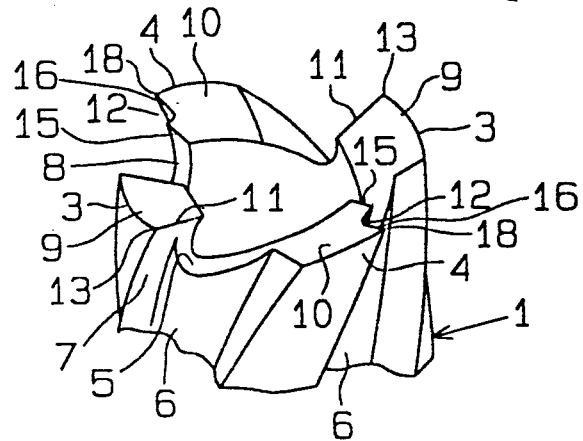
FIG. 1 is a partial perspective view illustrating the structure of individual cutting teeth of an annular hole cutter according to a first embodiment of the present invention.
Figure 2:
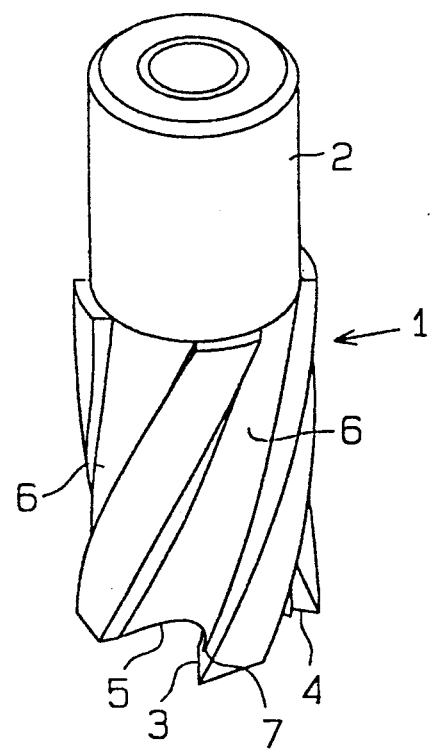
FIG. 2 is a general perspective view of the annular cutter shown in FIG. 1.
Figure 3:
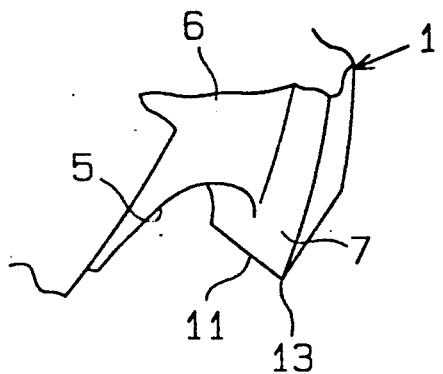
FIG. 3 is a perspective view illustrating a first cutting tooth of the annular cutter shown in FIG. 1.
Figure 4:
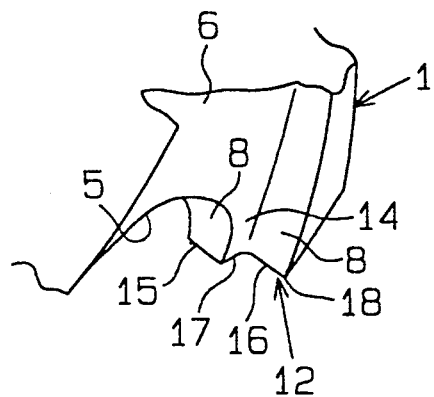
FIG. 4 is a perspective view illustrating a second cutting tooth of the annular cutter shown in FIG. 1.
Figure 5:
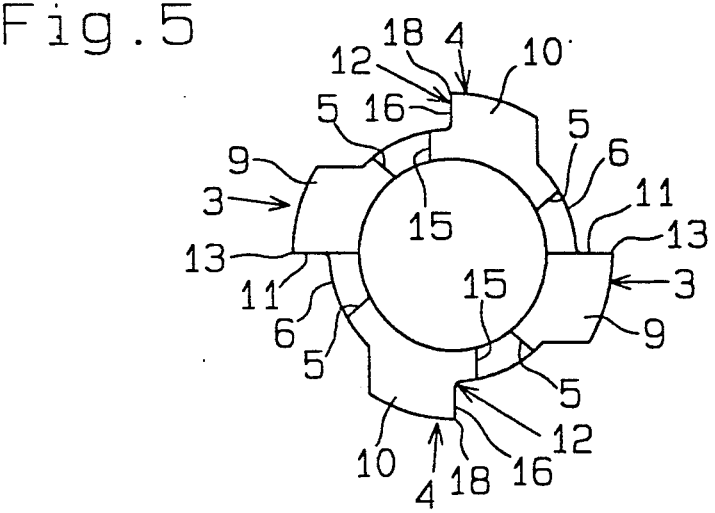
FIG. 5 is a bottom view of the annular cutter.
Figure 6:
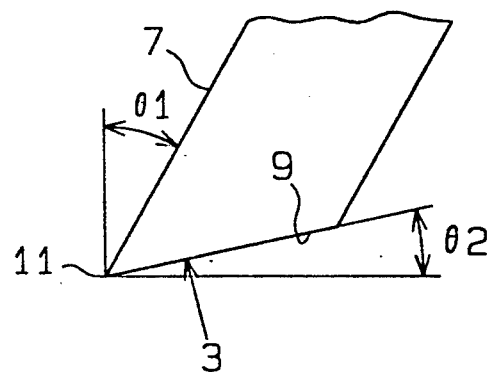
FIG. 6 is a side view showing the first cutting tooth.
Figure 7:
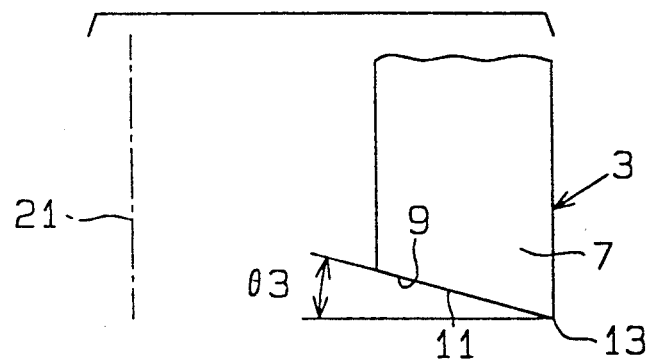
FIG. 7 is a front view showing the first cutting tooth.
Figure 8:
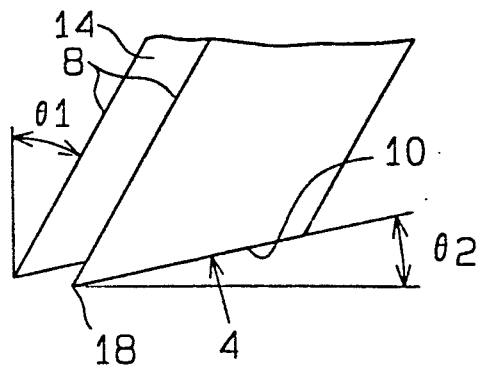
FIG. 8 is a side view showing the second cutting tooth.
Figure 9:
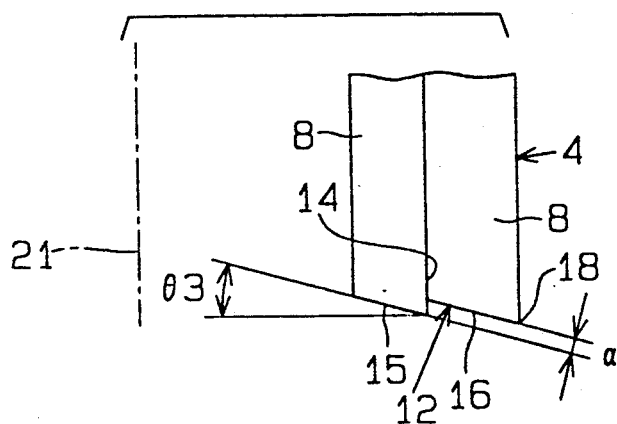
FIG. 9 is a front view showing the second cutting tooth.
Figure 10:
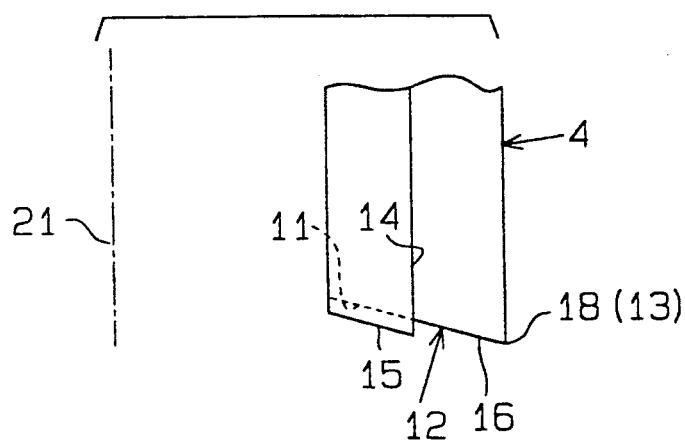
FIG. 10 is a front view showing the cutting edges of the first and second cutting teeth in comparison.

An annular hole cutter according to a first preferred embodiment of the present invention will now be described referring to FIGS. 1 to 12. As shown in FIGS. 1 and 2, a shank 2 is integrally formed at one end of a cylindrical cutter body 1 for attaching the annular cutter to a chuck of a drilling machine (not shown).

As shown in FIGS. 1 to 4, the cutter body 1 has a plurality of cutting teeth integrally formed on its distal end. The teeth are divided into alternating first and second cutting teeth 3, 4 which are arranged at equal intervals about the periphery of the distal end of the cutter body 1. The total number of the first and second cutting teeth 3 and 4 is an even number. In the embodiment shown, a total of four cutting teeth are provided. At least four cutting teeth should always be provided, although the actual number in any embodiment depends to a large extent on the diameter of the cutter body 1 and the teeth width.

When drilling a work, the cutter is rotated about its axis at a high speed and an axial thrusting force is imparted to the cutter body 1. Then, the first and second cutting teeth 3 and 4 start cutting a work piece 22 (see FIG. 12). As a result, an annular groove 23 is formed in the work piece 22, thus accomplishing drilling.

Ejection gullets 5 are formed at the periphery of one end of the cutter body 1 between adjacent cutting teeth 3 and 4. Spiral flutes 6 extend from the respective ejection gullets 5 along the outer surface of the cutter body 1. The ejection gullets 5 and the spiral flutes 6 serve to eject chips cut by the cutting teeth 3 and 4.

The first and second cutting teeth 3 and 4 respectively have cutting faces 7 and 8 tilted at the same angle, as shown in FIGS. 6 to 9. The slope angle $\theta1$ of the cutting faces 7 and 8 is set at 20 degrees in this embodiment. The first and second cutting teeth 3 and 4 respectively have circumferentially tapered bottom faces 9 and 10 that are inclined at the same angle. The taper angle $\theta2$ of the bottom faces 9 and 10 is preferably in the range of 5 to 30 degrees. In the embodiment shown, the taper angle $\theta2$ of the bottom faces 9 and 10 is 12 degrees. The bottom faces 9 and 10 of the first and second cutting teeth 3 and 4 are also inclined radially at an angle $\theta3$ in such a way that the outer edges of each bottom face 9 or 10 extend the farthest distally. The angle $\theta3$ is 15 degrees in this embodiment.

The first and second cutting edges 11 and 12 have edge tips 13 and 18, respectively positioned on the outermost surface of the cutter body 1.

A flute end 14 is formed on the cutting face 8 of the second cutting tooth 4 along the extending direction of the spiral flute 6. The second cutting edge 12 has stepped inner and outer cutting edges 15 and 16 that are separated by a relief surface 17 (see FIG. 4) The inner cutting edge 15 is located in front of the outer cutting edge 16 when viewed relative to the rotational direction of the body 1.

The first cutting edge 11 is formed linearly along the entire length and at the same level as the outer cutting edge 16 of the second cutting edge 12. As is apparent from FIG. 10, the inner portion of the first cutting edge 11 which corresponds to the inner cutting edge 15 is not as high as the inner cutting edge 15. Thus, the inner portion of the first cutting edge 11 does not take part in cutting.

In the annular hole cutter with the above-described structure, the bottom faces 9 and 10 of the first and second cutting teeth 3 and 4 are inclined at the same angle. As a result, the bottom faces 9 and 10 can be easily ground. This make it easier to both produce the cutters and regrind the cutting teeth.

Figure 11:
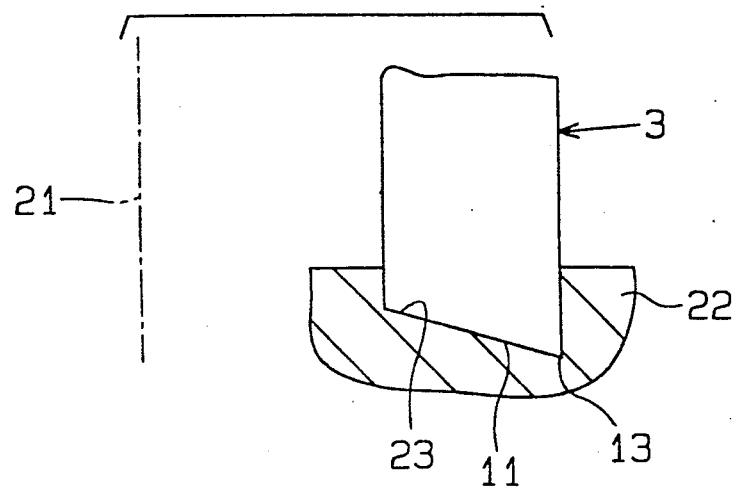
FIG. 11 is a cross section showing the drilling action of the first cutting tooth.
Figure 12:
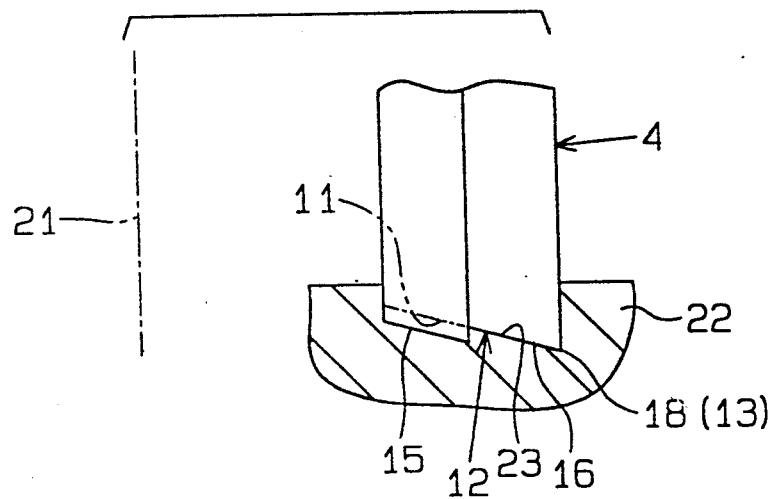
FIG. 12 is a cross section showing the drilling action of the second cutting tooth.
Figure 13:
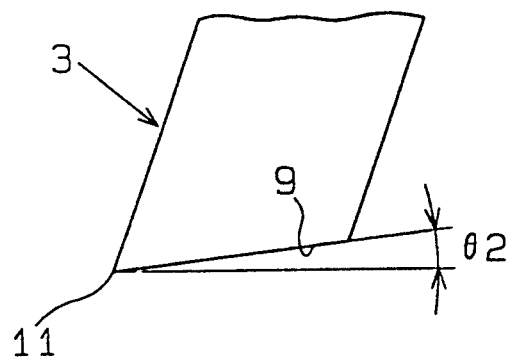
FIG. 13 is a cross section of a first cutting tooth according to a second embodiment of the present invention.
Figure 14:
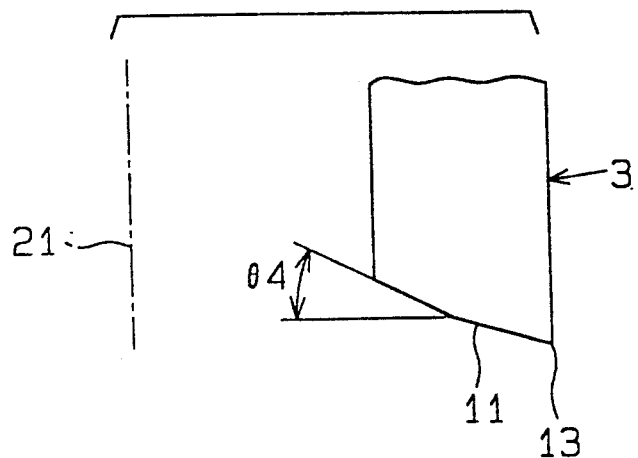
FIG. 14 is a front view of the first cutting tooth in the second embodiment.
Figure 15:
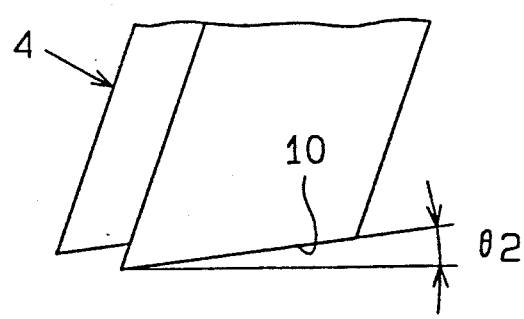
FIG. 15 is a side view of a second cutting tooth according to the second embodiment.
Figure 16:
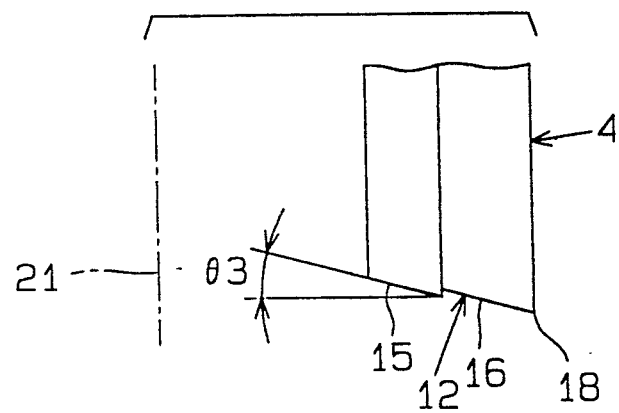
FIG. 16 is a front view of the second cutting tooth shown in FIG. 15.
Figure 17:
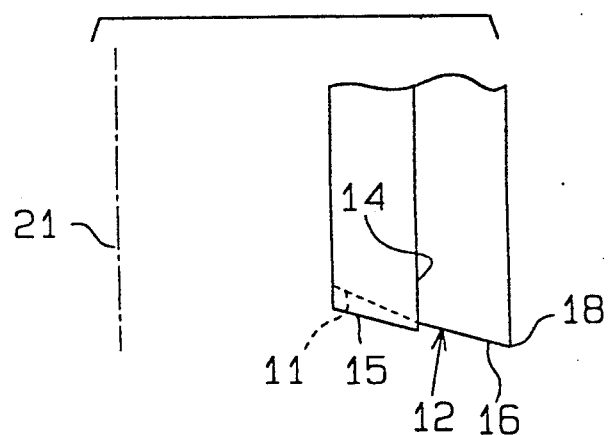
FIG. 17 is a front view that compares the cutting edges of the first and second cutting teeth in the second embodiment.

The cutting action of the described annular cutter will now be explained referring to FIGS. 11 and 12.

During drilling, a gradual thrusting force is applied to the cutter as it is rotated at a high speed about its center axis. As described above, the edge tips 13 and 18 of the respective first and second cutting edges 11 and 12 are formed on the outermost surface of the cutter body 1. Thus, the cutting edges 11 and 12 do not have a ridge-line shape. Since the cutting edges only extends in one direction from the end tips 13 or 18, chips produced by drilling a hole are ejected in just one direction, which is perpendicular to the cutting edge. Unlike the conventional cutters, the chips can easily be ejected without being tangled with one another. For this reason, at the beginning of the cutting, the cutting edges will immediately cut into the work piece 22 without binding through contact with the working piece 22, and thus the drilling action will start, forming the annular groove 23.

In the subsequent drilling action, the following action will be taken. Continuous cutting of the work piece 22 is performed by the alternate use of the first and second cutting edges 11 and 12. In other words, the linear first cutting edge 11 cuts the work piece 22 as shown in FIG. 11, and the second cutting edge 12 further cuts into the work as shown in FIG. 12.

The outer cutting edge 16 of the second cutting edge 12 is at the same level as the first cutting edge 11. Therefore, the outer cutting edge 16 cuts the work piece 22 by only the amount equal to the amount of the cutter thrust, yielding thin chips. The inner cutting edge 15 protrudes more than the first cutting edge 11. Therefore, the inner cutting edge 15 cuts deeply in the bottom of the groove 23, thus producing thick and harder chips.

Then, the first cutting edge 11 cuts the work piece 22 by the amount corresponding to the amount of the cutter thrust. The portion of the bottom of the groove 23 which has been cut by the inner cutting edge 15 of the second cutting edge 12 is deeper than the other portion. The first cutting edge 11 therefore cuts the portion where the outer cutting edge 16 of the second cutting edge 12 has cut. That portion of the first cutting edge 11 which corresponds in position to the inner cutting edge 15 of the second cutting edge 12 does not take part in cutting at this time. Then the second cutting edge 12 again cuts the work piece 22. The thin and thick chips will be produced in this manner.

As described above, the outer bottom surface of the groove 23 is cut by both the first and second cutting teeth 3 and 4 to sequentially yield thin chips. The inner bottom portion of the groove 23 is however cut by only half as many as the total number of cutting edges (i.e. inner cutting edge 15). The produced chips are can thus be twice as thick and hard as the thin chips.

Since the cutting by the cutting teeth 3 and 4 is a rotational movement around the center of the body 1, the cutting speed of the inner cutting edge differs from that of the outer cutting edge. The thick chips cut out from the inner side come out at a lower speed than the thin, chips cut out from the outer side. Thus, the thin and thick chips will not easily become entangled with one another due to the difference in speed in addition to the difference in hardness. The chips are therefore very smoothly ejected with little entanglement, so that resistance to the cutting force is reduced, resulting in efficient cutting.

As described above, it is easy to produce and regrind the described annular hole cutter. Additionally, the annular cutter can effectively cut into a work piece when cutting starts, and very efficiently perform the following cutting.

A second embodiment of the present invention will now be described referring to FIGS. 13 to 17. In the second embodiment, the taper angle $\Theta 2$ of the bottom faces 9 and 10 of the first and second cutting teeth 3 and 4 is 7 degrees, which is smaller than the taper angle in the first embodiment. The inner and outer cutting edges 15 and 16 of the second cutting edge 12 differ slightly in level in the thrusting direction thereof. The portion of the first cutting edge 11 which corresponds to the inner cutting edge 15 is radially tapered at a clearance angle $\theta 4$, which is greater than the radial inclination of the outer cutting edge portion 12 (i.e. $\theta 3$). This ensures that the inner face of the first cutting edge 11 does not cut into the work piece 22 during cutting.

The bottom face 9 of the first cutting tooth 3 is partially removed to provide the clearance angle $\theta 4$. The action of the hole cutter according to the second embodiment is substantially the same as that in the first embodiment.

Figure 18:
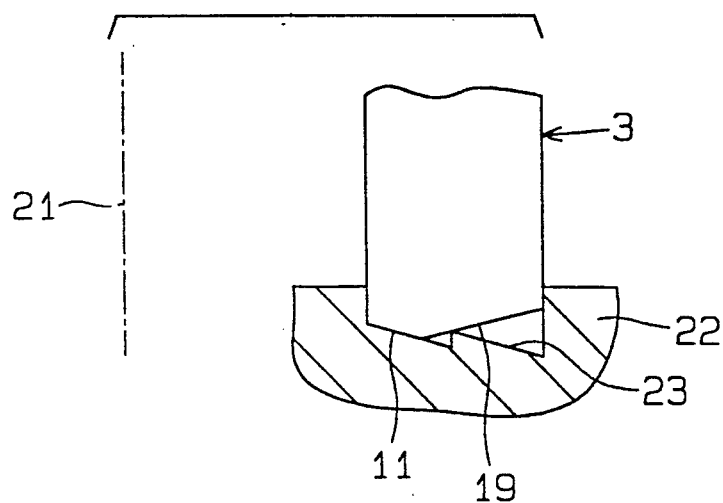
FIG. 18 is a cross section showing the drilling action of a first cutting tooth according to a third embodiment of the present invention.
Figure 19:
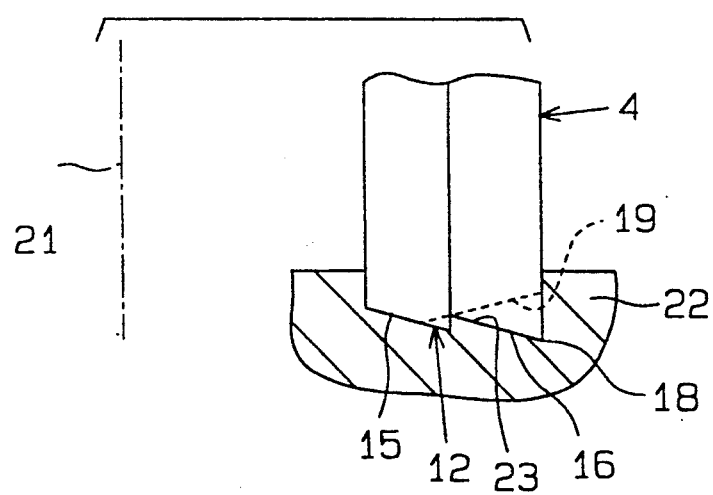
FIG. 19 is a cross section showing the drilling action of a second cutting tooth according to the third embodiment.

A third embodiment of the present invention will now be described referring to FIGS. 18 and 19. In the third embodiment, the shape of the first cutting teeth 3 is changed. Specifically, the inner portion of the first cutting edge 11 is set at the same level as the inner cutting edge 15. The outer portion of the cutting edge 11 then has a back-off face 19 which is formed to insure that the outer portion of the cutting edge 11 does not take part in cutting. With this arrangement, the cutting edges 11 and 15 will cut thin chips from the inner portion of the groove 23. At the same time, cutting edges 16 will cut thick and hard chips out of the outer portion of the groove 23. The thick and hard chips will be ejected at a higher speed than the thin chips. Like the above-described two embodiments, the third embodiment yields hard and thick chips and also at a different speed from that of yielding thin chips. Consequently, both chips can smoothly be ejected to ensure efficient hole cutting as per the first embodiment.

Since the back-off face 19 is formed on the outer part of the first cutting edge 11, the overall shape of the first cutting edge 11 is a ridgeline. When cutting begins, the edge tip 18 of the outer cutting edge 16 starts cutting in a work piece. This prevents the annular cutter from binding when cutting begins.

Figure 20:
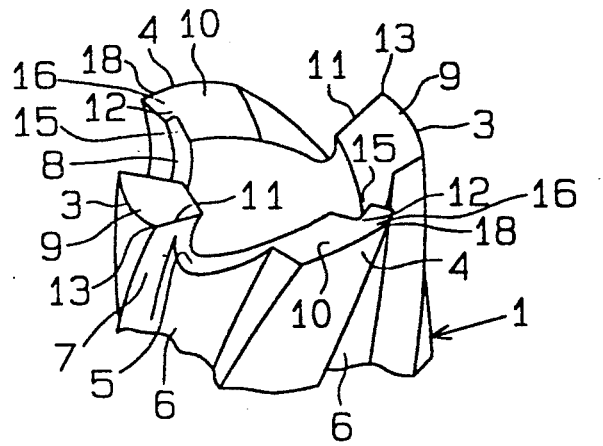
FIG. 20 is a partial perspective view illustrating the structure of individual cutting teeth of an annular cutter according to a fourth embodiment the present invention.
Figure 21:
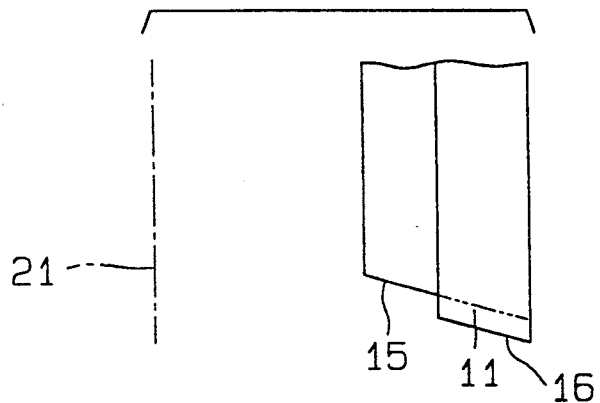
FIG. 21 is a front view showing the cutting edges of first and second cutting teeth in comparison.

A description will now be given of a fourth embodiment of the present invention referring to FIGS. 20 and 21. In this embodiment, the inner cutting edge 15 of the second cutting tooth 4 is positioned behind the outer cutting edge 16 (relative to the rotational direction of the body 1). Additionally, the cutting edge 11 of the first cutting tooth 3 is formed at the same level as the inner cutting edge 15. In this embodiment, therefore, thick and hard chips are cut by the outer cutting edge 16.

Figure 22:
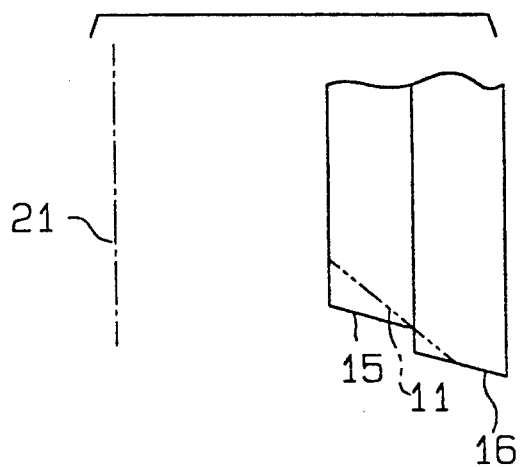
FIG. 22 is a front view showing the cutting edges of first and second cutting teeth in comparison according to a fifth embodiment of the present invention.
Figure 23:
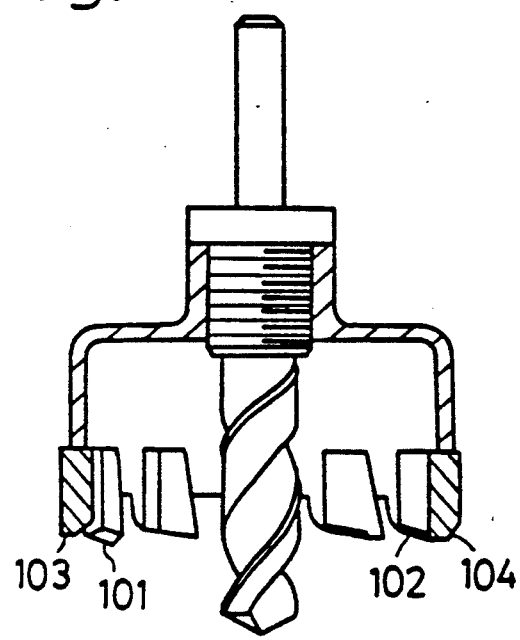
FIG. 23 is a cross section of a conventional annular cutter.
Figure 24:
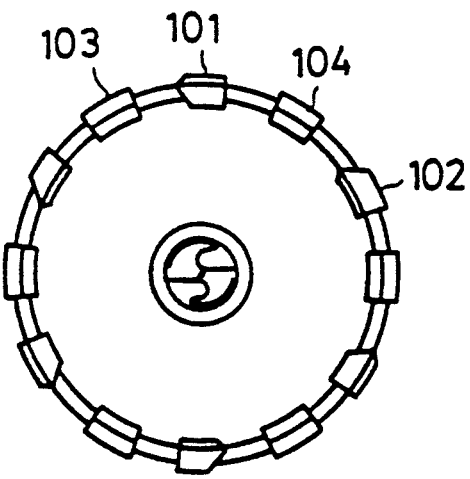
FIG. 24 is a bottom view of the conventional annular cutter.
Figure 25:
FIG. 25 is a partial cross section of individual cutting teeth shown in FIG. 24.
Figure 26:
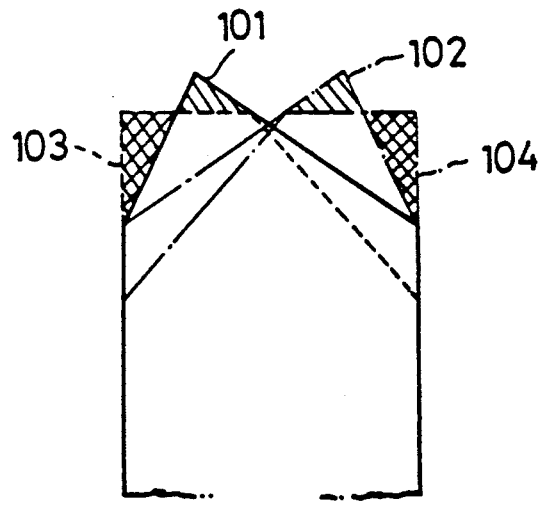
FIG. 26 an enlarged view illustrating the positional relationship between the cutting edges of the individual cutting teeth.
Figure 27:
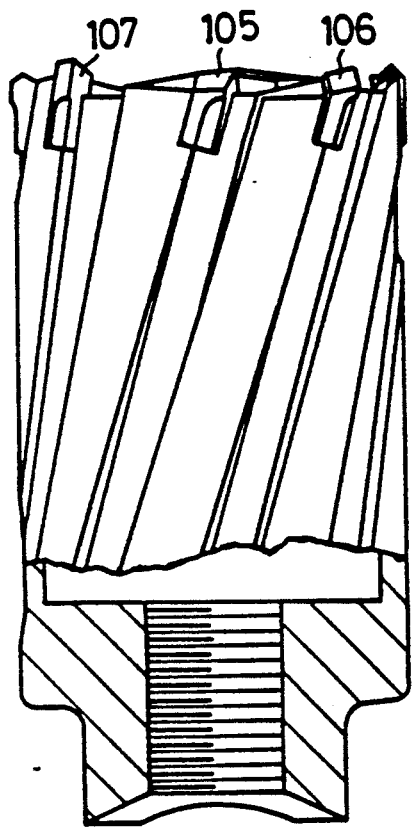
FIG. 27 is a partially cutaway front view of another conventional annular cutter.
Figure 29:
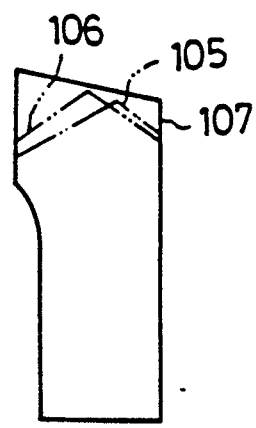
FIG. 29 is a front, view showing the position of the cutting edge of the cutting tooth of the second conventional annular cutter.
Figure 28:
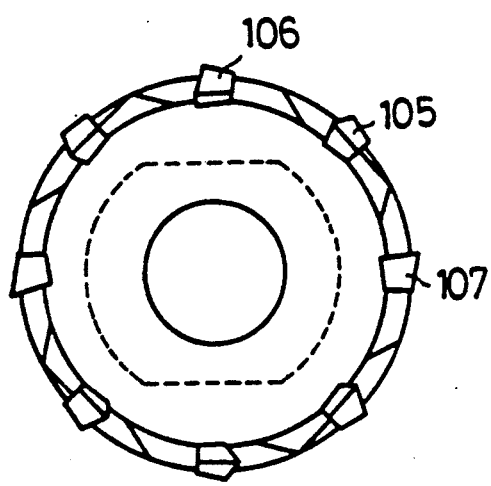
FIG. 28 is a plan view showing the arrangement and structures of the cutting teeth of the second conventional annular cutter.
Figure 30:
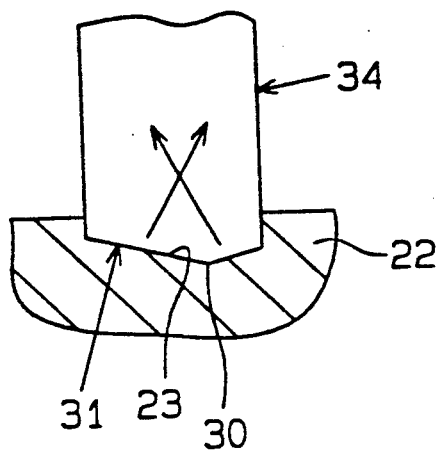
FIG. 30 a cross section of a different prior art.
Figure 31:
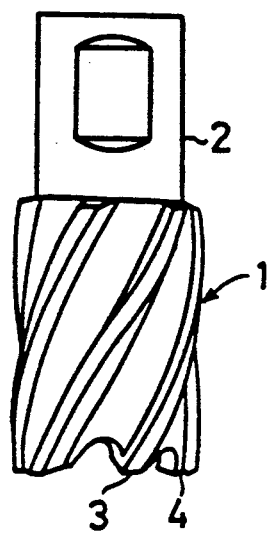
FIG. 31 is a front view of a still another conventional annular cutter.
Figure 32:
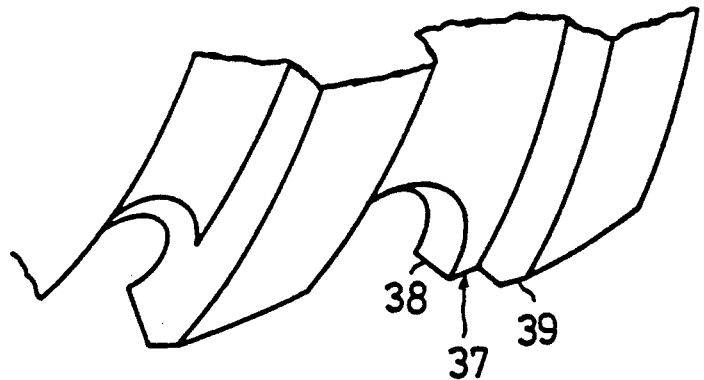
FIG. 32 is an enlarged perspective view showing first and second cutting teeth of this annular cutter.

Referring to FIG. 22, a fifth embodiment of the present invention will now be discussed. The cutting edges 15 and 16 of the second cutting tooth 4 are formed in the same manner as those in the fourth embodiment. However, the cutting edge 11 of the first cutting tooth 3 has a tapered clearance that is made large and high enough that the portion of the cutting edges 11 that corresponds in radial position to the inner cutting edges 15 will not ordinarily contact the work during cutting. In order to accomplish that, a portion of the cutting edge 11 that corresponds in radial position to an inner portion of the outer cutting edge 16 is also a part of the tapered surface. Thus, as can be best understood by referring to FIG. 22, the active portion of cutting edge 11 is narrower in diameter than cutting edge 16.

The present invention is not limited to the structures of the above-described embodiments, but may also be achieved in the following modifications.

The total number of the first and second cutting teeth 3 and 4 is any even number equal to or greater than four.

The slope angle θ1 and the taper angle Θ2 of the cutting teeth 3 and 4, as well as the angle of inclination of the bottom faces 9 and 10, Θ3, may be changed as needed.

Therefore, the present examples and embodiments are to be considered as illustrative and not restrictive, and the invention is not to be limited to the details given herein, but may be modified within the scope of the appended claims.

What is claimed is:

1. An annular hole cutter comprising:
a generally cylindrical body having a shank at a proximal end thereof, a rotational axis and a distal end; and
a plurality of alternatively arranged first and second cutting teeth positioned at spaced intervals about the distal end of the body, each of the first and second cutting teeth having a front side and a tapered bottom face, each tapered bottom face having an inner edge near the rotational axis and an outer edge remote from the rotational axis, the outer edge having a tip, a most distal portion of the tip being positioned on the radially outermost surface of the body, the inner edge and the outer edge being arranged such that the inner edge is axially closer to the shank than the outer edge, wherein,
the first cutting teeth each have a leading edge that includes an active cutting surface and an inactive surface, and
the second cutting teeth each have a stepped leading edge to form circumferentially stepped inner and outer cutting edges, the relative axial heights of the first and second cutting teeth being arranged so that the active cutting surfaces of the first cutting teeth are formed at the same axial height as their radially corresponding cutting edges of the second cutting teeth, and the inactive surface of the first cutting teeth are formed at a different axial height than their radially corresponding cutting edges of the second cutting teeth.

2. An annular hole cutter according to claim 1, wherein the front side of the first and second cutting teeth are tilted at the same angle.

3. An annular hole cutting according to claim 1, wherein the body further comprises a plurality of flutes formed in an outer periphery of the body for discharging chips cut by said first and second cutting teeth and a plurality of ejection gullets, one of the plurality of ejection gullets formed between each of the first and second cutting teeth, one of the plurality of flutes beginning in each of the ejection gullets.

4. An annular hole cutter according to claim 1, wherein the inner cutting edges of the second cutting teeth are positioned in front of the outer cutting edges of the second cutting teeth relative to an intended rotational direction of the cutter body.

5. An annular hole cutter according to claim 4, wherein the active cutting surfaces of the first cutting teeth are positioned at an equivalent axial height and radial distance from the rotational axis as the outer cutting edges of the second cutting teeth.

6. An annular hole cutter according to claim 1, wherein the active cutting surfaces of the first cutting teeth are positioned at an equivalent axial height and radial distance from the rotational axis as the outer cutting edges of the second cutting teeth.

7. An annular hole cutter comprising:
a generally cylindrical cutter body having a shank at a proximal end thereof, a rotational axis and a distal end;
a plurality of alternately arranged first and second cutting teeth positioned at spaced intervals about the distal end of the body, each of the first and second cutting teeth having a tapered bottom face and a front side, each front side being tilted at the same angle, each tapered bottom face being at the same angle and having an inner edge near the rotational axis and an outer edge remote from the rotational axis, the tapered bottom face being arranged such that the inner edge is axially closer to the shank than the outer edge, such that the distal most tips of each tooth is positioned on the radially outermost surface of the body; and
a plurality of flutes formed in the outer periphery of the cutter body for discharging chips cut by said teeth, each flute beginning in an ejection gullet formed between adjacent cutting teeth; and wherein,
the first cutting teeth each have a substantially radially extending leading edge that includes a radially outer active cutting surface and a radially inner inactive surface, and
the second cutting teeth each have a stepped leading edge to form circumferentially stepped inner and outer cutting edges wherein the inner cutting edges are positioned in front of the outer cutting edges relative to the intended rotational direction of the cutter body, the relative axial heights of the first and second cutting teeth being arranged so that the active cutting surfaces of the first cutting teeth are formed at the same axial height as the outer cutting edges of the second cutting teeth, and the inner cutting edges of the second cutting teeth extend further in the distal direction when the inactive surfaces of the first cutting teeth.

8. An annular hole cutter as recited in claim 7 wherein the radially inner inactive surfaces of the first cutting teeth have tapered clearances.

* * * * *